Nov. 6, 1956  O. A. COSTELLO  2,769,349
DISCONNECTABLE WORM GEARING
Filed May 24, 1951
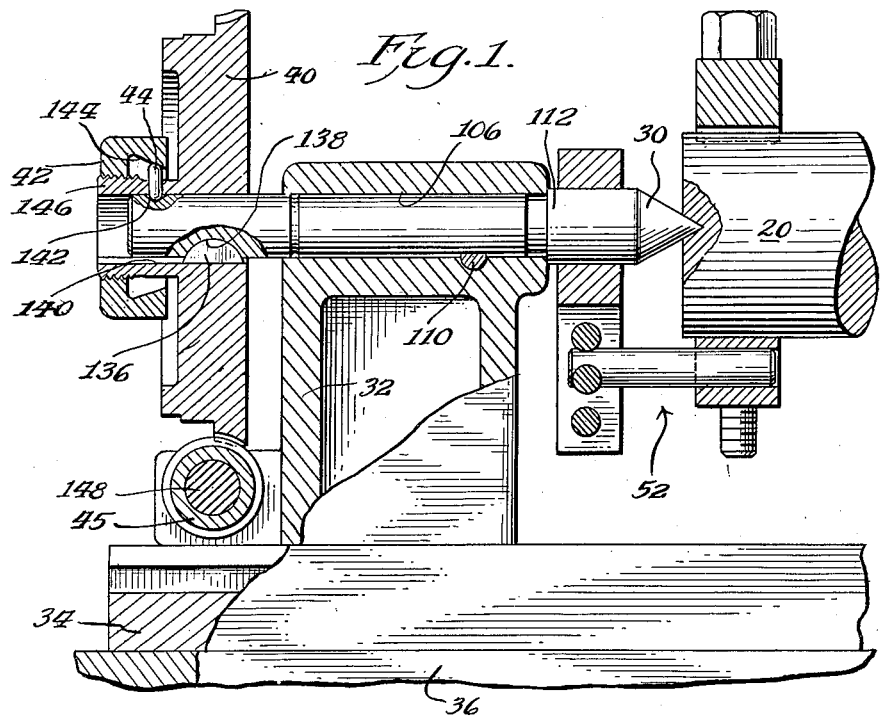
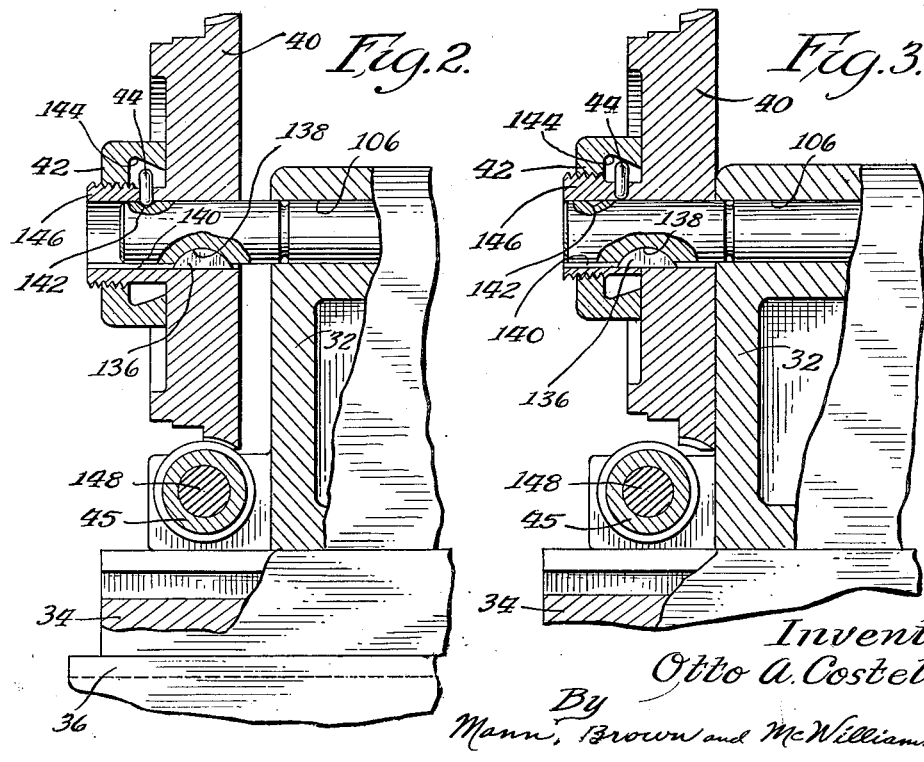
Inventor
Otto A. Costello
By Mann, Brown and McWilliams
Attys

United States Patent Office 2,769,349
Patented Nov. 6, 1956

2,769,349

DISCONNECTABLE WORM GEARING

Otto A. Costello, South Bend, Ind., assignor to South Bend Lathe Works, South Bend, Ind., a corporation of Indiana Application May 24, 1951, Serial No. 228,100

7 Claims. (Cl. 74—405)

My invention relates to index centers of the kind used to hold work in milling machines, drill presses, shapers, and similar types of machines.

An object of my invention is to provide a new and improved index center which can be more quickly and easily adjusted to position a workpiece in any desired position.

Another object is to provide a new and improved index center which will more accurately and positively hold a workpiece in any selected position.

These and other objects and advantages will become apparent as the disclosure proceeds and the description is read in conjunction with the accompanying drawings.

Fig. 1 is a fragmentary side sectional view of the index center of the invention;

Fig. 2 is a view similar to the left hand end of Fig. 1 but showing the worm wheel unlocked from the live center; and Fig. 3 is a view similar to Fig. 2 but with the worm wheel shifted out of engagement with the worm drive.

In Fig. 1 I have shown an end portion of a circular workpiece 20 supported in an index center embodying my invention. The workpiece 20 is held in position between a fixed half center (not shown) which is associated with the opposite end of the workpiece and a live center or spindle 30 mounted in a spindle support 32 which is attached to a suitable base 34. The base in turn is secured to a work table 36 in any suitable manner.

The live center support 32 also carries a worm wheel 40 slidable along live center 30 but capable of being secured to the live center by a lock nut 42 and lock pin 44. In a locked position the worm wheel 40 is meshed with a worm gear 45 that is suitably mounted on a drive shaft 148 which is rotated manually and which may be provided with any suitable form of handle (not shown). The live center may be locked to the live center support by a binder plug 110 disposed in the live center support 32 and adapted to be forced into frictional engagement with the center 30 by means of any suitable thumbscrew arrangement (not shown).

The workpiece 20 is free to rotate relative to the fixed center (not shown) but is held against rotation relative to the live center 30 by a suitable work driver indicated generally as reference character 52. With the parts positioned as shown in Fig. 1 the workpiece 20, clamp 52, live center 30, and worm wheel 40 may be rotated by turning drive shaft 148 and worm gear 45 when the binder plug 110 is disengaged. When the workpiece is properly positioned, it may be locked in this position by re-engaging the binder plug 110.

A principal feature of the invention resides in the fact that worm wheel 40 may be moved longitudinally of live center 30 to disengage the worm wheel from the worm gear 45 as shown in Fig. 3 to permit direct manual rotation of the workpiece 20 to the approximate position desired. Thereafter, the worm and worm wheel may be re-engaged and the workpiece positioned more accurately by suitably rotating the drive shaft 148. This increases the speed and facility with which a workpiece may be brought to the exact position desired.

The live center support 32 is formed with a horizontal bore 106 in its upper end and the live center 30 is rotatably mounted in this bore. Engagement between the right-hand end of the live center support 32 and an annular shoulder 112 provided by forming the center 30 with an enlarged head prevents leftward movement of this center.

I shall now describe the facilities which are provided for quickly and accurately rotating the live center 30 to bring the workpiece 20 into desired position. The worm wheel 40 and lock nut 42 are carried on the left-hand or outside end of the live center 30. The worm wheel 40 is held against rotation on the live center 30 by a key 136 located in a recess 138 in the live center 30 and having an outer end projecting into a longitudinally extending keyway 140 formed in worm wheel 40. It will be apparent that this construction permits longitudinal movement of the worm wheel 40 with respect to the live center 30 but prevents relative rotation therebetween.

In the position of the parts shown in Fig. 1, the worm wheel 40 is held against longitudinal movement relative to the live center 30 by a pin 44 which engages an indentation 142 in the live center and is held in engagement with such indentation by the conical inner surface 144 of the nut 42. This nut threadedly engages a hub 146 formed integral with the worm wheel 40. When this nut 42 is screwed inwardly until it abuts the worm wheel 40 as shown in Fig. 2, the pin 44 is free to rise out of the indentation 142 thereby permitting the worm wheel 40 to be shifted to the right to the position shown in Fig. 3. This disengages the worm wheel 40 from worm gear 45 and permits the workpiece to be quickly and easily rotated by hand to the position desired or as close thereto as it is feasible to move the workpiece by hand.

From the description of my invention read in the light of the accompanying drawings, it should be clear that I have provided a novel index center that is sturdy, precise in operation, and which is particularly designed to facilitate location of a workpiece in any predetermined division of a revolution for presentation of a particular part of the workpiece to a tool. While I have illustrated and described only a single embodiment of my invention, it is to be understood that my invention is not limited to the precise form shown but includes all modifications, variations, and equivalents coming within the scope of the appended claims.

I claim:

1. In an index head having a support and a spindle rotatably mounted on said support, the improvement comprising a worm wheel keyed to said spindle and slidable axially thereof, a lock nut threaded on said wheel, a lock pin carried on said wheel, said lock nut jamming said pin against said spindle to lock said wheel to said spindle when turned in one direction and releasing said pin when turned in the other direction, a gear carried by said support, said wheel being moved into meshing or non-meshing relationship with said gear by moving said wheel axially along said spindle so that said spindle may be rotated by said gear or independently of said gear, and means to rotate said gear.

2. In an index head having a support and a spindle rotatably mounted in said support, the improvement comprising a worm wheel slidably mounted on said spindle but held against rotation relative to said spindle, said worm wheel having an outwardly extending hub, a hollow lock nut threaded on said hub, a lock pin extending radially through said hub in contiguity with said spindle, said lock pin being jammed between said lock nut and said spindle to secure said wheel to said spindle when said lock nut is turned in one direction and released when said lock nut is turned in the other direction thereby releasing said worm wheel for axial movement relative to said spindle, a shaft journalled in said support, a gear secured to said shaft in position to engage said wheel, said wheel being movable axially along said spindle to engage or disengage said gear, and a handle secured to said shaft.

3. In an index head having a support and a spindle rotatably mounted in said support, the improvement comprising a worm wheel slidably mounted on said spindle but held against rotation relative thereto, said worm wheel having an outwardly extending hub, a hollow lock nut threaded onto said hub, a lock pin within said hollow lock nut and extending through a radial bore in said hub in contiguity with said spindle, said lock pin being jammed between said lock nut and said spindle when said lock nut is turned in one direction and released when said lock nut is turned in the other direction, a circumferential scale formed on said wheel, spaced depending portions on said support, a shaft journalled in said depending portions, a gear secured to said shaft in position to engage said wheel, said wheel being movable axially along said spindle to engage or disengage said gear, a graduated collar rotatably mounted on said shaft, means to lock said graduated collar to said shaft, and a handle attached to said shaft to rotate said gear wheel and spindle when said wheel is in engagement with said gear.

4. In an index head having a support and a spindle rotatably mounted therein, the improvement comprising a worm wheel slidably mounted on said spindle but held against rotation relative thereto, said worm wheel having an outwardly extending hub portion, an inwardly opening cup-shaped lock nut threaded on said hub, said lock nut having tapered walls, a lock pin engaged by a wall of said lock nut and extending radially through said hub in contiguity with said spindle, said lock pin being jammed between said lock nut and a recess provided in said spindle to secure said wheel to said spindle when said lock nut is turned in one direction and released when said lock nut is turned in the other direction thereby releasing said gear wheel for axial movement relative to said spindle, a shaft journalled in said support, a gear secured to said shaft in position to engage said wheel when said lock pin is jammed in said recess, said wheel being movable axially along said center to engage or disengage said gear, and a handle secured to said shaft.

5. In an index head having a support and a spindle rotatably mounted in said support, the improvement comprising a worm wheel mounted on said spindle in nonrotatable, axial sliding relationship, a gear carried by said support, means to rotate said gear, said wheel being moved axially along said spindle into meshing or nonmeshing relationship with said gear such that said spindle rotates with said gear or independently of said gear, an interengaging member carried between said worm wheel and said spindle, and locking means mounted on said worm wheel and shiftable between a first position wherein said locking means jams said interengaging member against said spindle to lock said worm wheel to said spindle and a second position wherein said worm wheel is released for axial movement relative to said spindle.

6. In an index head having a support and a spindle rotatably mounted in said support, the improvement comprising a worm wheel mounted on said spindle in nonrotatable, axial sliding relationship, a gear carried by said support, means to rotate said gear, said wheel being moved axially along said spindle into meshing or nonmeshing relationship with said gear such that said spindle rotates with said gear or independently of said gear, an interengaging member carried between said worm wheel and said spindle, and locking means shiftable axially on said worm wheel between a first position wherein said locking means jams said interengaging member against said spindle to lock said worm wheel to said spindle and a second position wherein said worm wheel is released for axial movement relative to said spindle.

7. In an index head having a support and a spindle rotatably mounted in said support, the improvement comprising a worm wheel mounted on said spindle in nonrotatable, axial sliding relationship, a gear carried by said support, means to rotate said gear, said wheel being moved axially along said spindle into meshing or nonmeshing relationship with said gear such that said spindle rotates with said gear or independently of said gear, an interengaging member carried between said worm wheel and said spindle and projecting through an opening formed in said worm wheel to engage a recess formed in said spindle, and locking means mounted on said worm wheel and shiftable between a first position wherein said locking means jams said interengaging member into said recess to lock said worm wheel to said spindle and a second position wherein said worm wheel is released for axial movement relative to said spindle.

References Cited in the file of this patent

UNITED STATES PATENTS

| Number | Name | Date |
|---|---|---|
| 341,437 | Ernst | May 4, 1886 |
| 343,846 | Phillips | June 15, 1886 |
| 768,454 | Hill | Aug. 23, 1904 |
| 877,882 | Blum | Jan. 28, 1909 |
| 1,312,277 | Shields et al. | Aug. 5, 1919 |
| 1,509,505 | Garrard | Sept. 23, 1924 |
| 1,813,209 | Spase | July 7, 1931 |
| 1,900,233 | Emanons | Mar. 7, 1933 |
| 2,042,847 | Holtschneider | June 2, 1936 |
| 2,178,264 | Meyer | Oct. 31, 1939 |
| 2,209,493 | Tscherner | July 30, 1940 |
| 2,242,978 | Moen | May 20, 1941 |
| 2,386,145 | Ruysdeal | Oct. 2, 1945 |
| 2,386,880 | Osplack | Oct. 16, 1945 |
| 2,463,385 | Holshan | Mar. 1, 1949 |
| 2,503,146 | Anketell | Apr. 4, 1950 |